US012651314B2

(12) United States Patent
Yu et al.

(10) Patent No.: US 12,651,314 B2
(45) Date of Patent: Jun. 9, 2026

(54) PROCESSING MONOCULAR VIDEOS USING THREE-DIMENSIONAL GAUSSIAN SPLATTING

(71) Applicant: Lemon Inc., Grand Cayman (KY)

(72) Inventors: Qihang Yu, Los Angeles, CA (US);
Inkyu Shin, Los Angeles, CA (US);
Xiaohui Shen, Los Angeles, CA (US);
Liang-Chieh Chen, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 246 days.

(21) Appl. No.: 18/629,804

(22) Filed: Apr. 8, 2024

(65) Prior Publication Data

US 2025/0315923 A1 Oct. 9, 2025

(51) Int. Cl.

| | |
|---|---|
| *G06T 5/50* | (2006.01) |
| *G06T 7/194* | (2017.01) |
| *G06T 17/00* | (2006.01) |
| *G06V 20/40* | (2022.01) |

(52) U.S. Cl.
CPC .............. *G06T 5/50* (2013.01); *G06T 7/194* (2017.01); *G06T 17/00* (2013.01); *G06V 20/49* (2022.01); *G06T 2207/20221* (2013.01)

(58) Field of Classification Search
CPC .......... G06V 20/49; G11B 27/00; G06T 5/50; G06T 7/11; G06T 7/194; G06T 11/00; G06T 17/00; G06T 2207/20221
USPC ....................................................... 345/629
See application file for complete search history.

(56) References Cited

U.S. PATENT DOCUMENTS

| | | | | |
|---|---|---|---|---|
| 2007/0237393 A1* | 10/2007 | Zhang | ....................... | G06T 7/11 |
| | | | | 382/173 |
| 2024/0135623 A1* | 4/2024 | Alimo | ..................... | G06T 15/00 |
| 2025/0285236 A1* | 9/2025 | Mu | ........................... | G06T 7/50 |

\* cited by examiner

*Primary Examiner* — Jacinta M Crawford
(74) *Attorney, Agent, or Firm* — BakerHostetler

(57) ABSTRACT

The present disclosure describes techniques for processing monocular videos using three-dimensional gaussian splatting (3DGS). Spatial decomposition and temporal decomposition are performed on a monocular video to generate a plurality of clips. A first set of 3DGS representing foreground objects in each of the plurality of clips are initialized and optimized. A second set of 3DGS representing background in each of the plurality of clips are initialized and optimized. Two images are generated for each frame comprised in each of the plurality of clips based on the first set of 3DGS and the second set of 3DGS, respectively. Two images are merged to generate a resulting image for each frame in each of the plurality of clips. The resulting image accurately represents a corresponding frame in the monocular video.

20 Claims, 12 Drawing Sheets

200

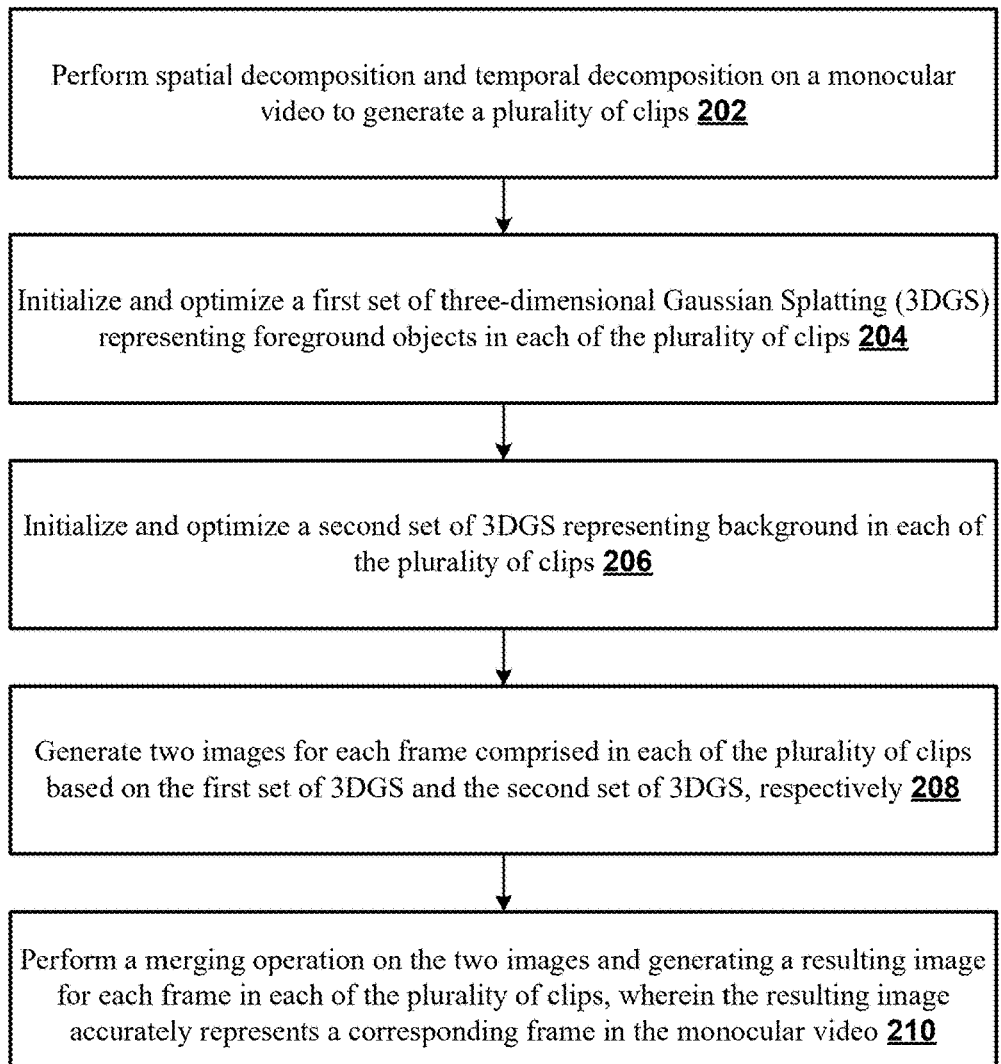

Perform spatial decomposition and temporal decomposition on a monocular video to generate a plurality of clips 202

Initialize and optimize a first set of three-dimensional Gaussian Splatting (3DGS) representing foreground objects in each of the plurality of clips 204

Initialize and optimize a second set of 3DGS representing background in each of the plurality of clips 206

Generate two images for each frame comprised in each of the plurality of clips based on the first set of 3DGS and the second set of 3DGS, respectively 208

Perform a merging operation on the two images and generating a resulting image for each frame in each of the plurality of clips, wherein the resulting image accurately represents a corresponding frame in the monocular video 210

Perform spatial decomposition on a monocular video by extracting
segmentation masks of foreground objects comprised in the monocular video,
wherein the foreground objects comprise moving objects 302

Perform temporal decomposition on the monocular video by progressively
dividing the monocular video into a plurality of clips 304

Figure 4:
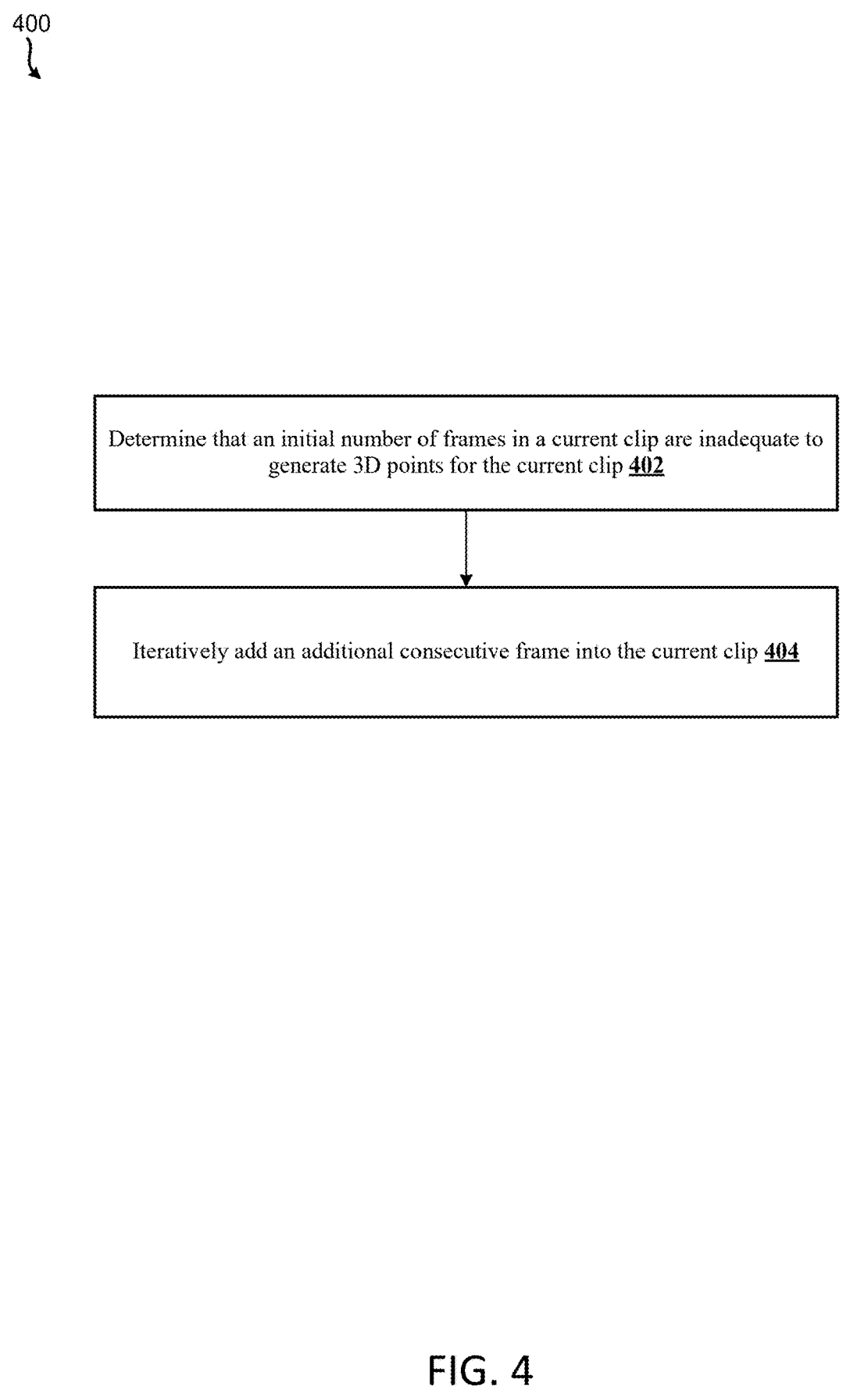

400

Determine that an initial number of frames in a current clip are inadequate to generate 3D points for the current clip 402

Iteratively add an additional consecutive frame into the current clip 404

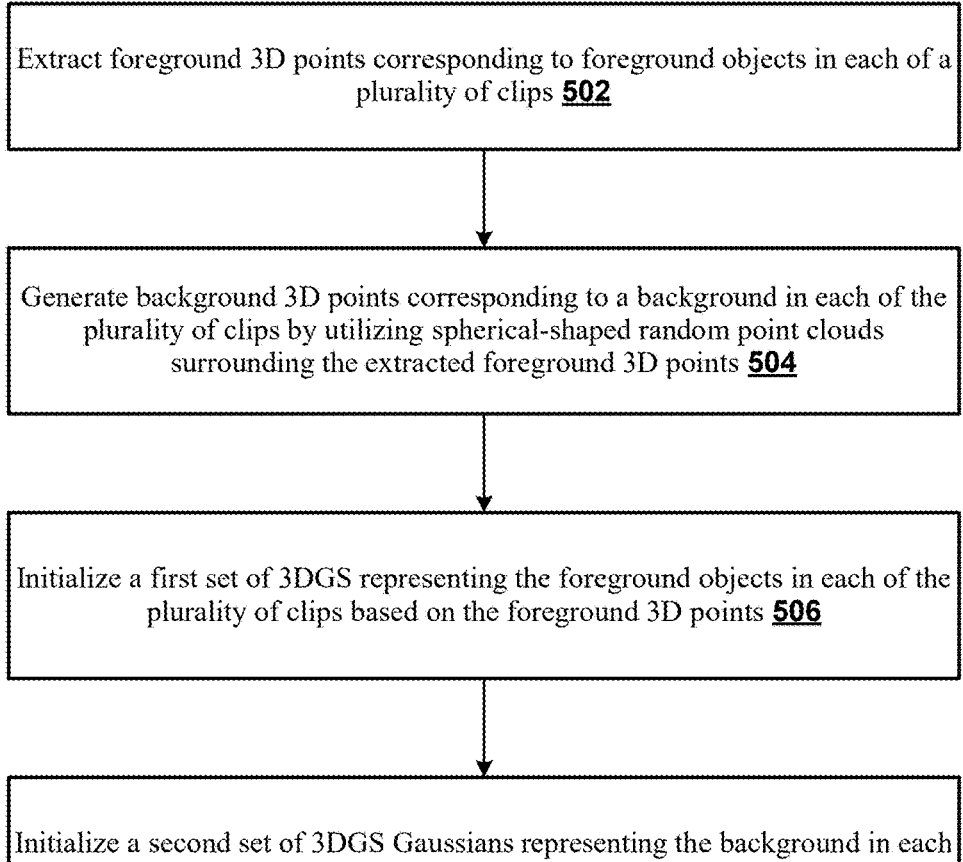

Extract foreground 3D points corresponding to foreground objects in each of a plurality of clips 502

Generate background 3D points corresponding to a background in each of the plurality of clips by utilizing spherical-shaped random point clouds surrounding the extracted foreground 3D points 504

Initialize a first set of 3DGS representing the foreground objects in each of the plurality of clips based on the foreground 3D points 506

Initialize a second set of 3DGS Gaussians representing the background in each of the plurality of clips based on the background 3D points 508

Perform deformation operations on a first set of 3DGS and a second set of
3DGS, respectively 602

Reformulate the first set of 3DGS and the second set of 3DGS as a clip-3DGS
corresponding to each of the plurality of clips 604

700

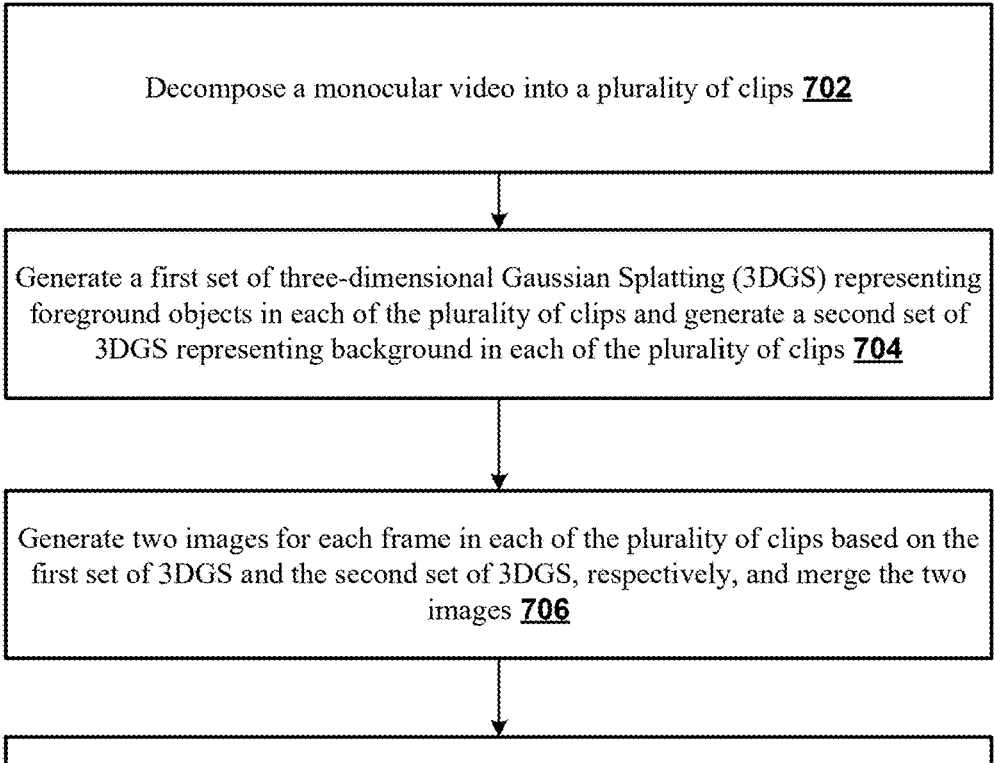

Decompose a monocular video into a plurality of clips 702

Generate a first set of three-dimensional Gaussian Splatting (3DGS) representing foreground objects in each of the plurality of clips and generate a second set of 3DGS representing background in each of the plurality of clips 704

Generate two images for each frame in each of the plurality of clips based on the first set of 3DGS and the second set of 3DGS, respectively, and merge the two images 706

Perform clip-level optimization by optimizing merged rendered outputs for each of the plurality of clips using a reconstruction loss 708

```
┌─────────────────────────────────────────────────────────────────┐
│                                                                   │
│   Employ a two dimensional (2D) learnable parameter for           │
│   facilitating pixel-wise merging with corresponding              │
│   learnable parameter values 802                                  │
│                                                                   │
└─────────────────────────────────────────────────────────────────┘
                                │
                                ▼
┌─────────────────────────────────────────────────────────────────┐
│                                                                   │
│   Generate resulting images for all frames in a monocular video   │
│   by optimizing N different parameter values, wherein N           │
│   represents a total number of frames in the monocular video 804  │
│                                                                   │
└─────────────────────────────────────────────────────────────────┘
```

| | Method | success rate | PSNR | SSIM | Time |
|---|---|---|---|---|---|
| NeRF-based | Robust-Dyn (Liu et al., 2023) | 28 / 28 | 26.8 | 0.795 | 746m |
| | NLA (Kasten et al., 2021) | 28 / 28 | 27.3 | 0.795 | 309m |
| | CoDeF (Ouyang et al., 2023) | 28 / 28 | 29.4 | 0.869 | 28m |
| 3DGS-based | 3DGS (Kerbl et al., 2023) | 20 / 28 | 24.8 | 0.832 | 10m |
| | Deform-3DGS (Yang et al., 2023) | 20 / 28 | 30.6 | 0.919 | 50m |
| 3DGS-based (ours) | Video-3DGS (3k) | 28 / 28 | 37.6 | 0.980 | 11m |
| | Video-3DGS (5k) | 28 / 28 | 41.2 | 0.989 | 22m |
| | Video-3DGS (10k) | 28 / 28 | 45.8 | 0.995 | 56m |

Figure 11:
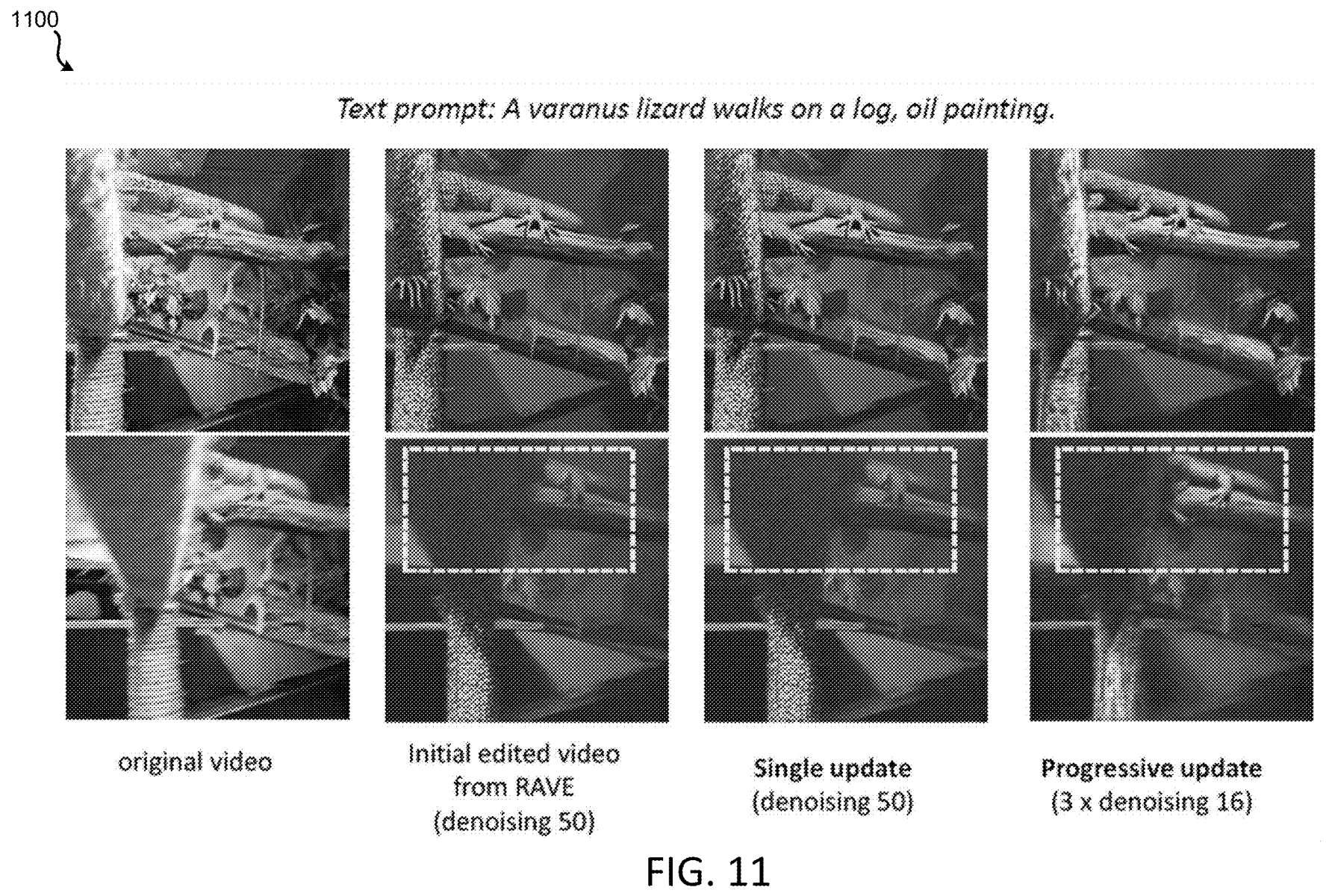

Text prompt: A varanus lizard walks on a log, oil painting.

original video

Initial edited video
from RAVE
(denoising 50)

Single update
(denoising 50)

Progressive update
(3 x denoising 16)

PROCESSING MONOCULAR VIDEOS USING THREE-DIMENSIONAL GAUSSIAN SPLATTING

BACKGROUND

Machine learning models are increasingly being used across a variety of industries to perform a variety of different tasks. Such tasks may include video reconstruction and editing. Improved techniques for utilizing machine learning models in video generation and editing are desirable.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 2 shows an example process for image generation in accordance with the present disclosure.

FIG. 4 shows an example process for performing progressive temporal decomposition in accordance with the present disclosure.

FIG. 5 shows an example process for initializing a set of 3DGS representing the foreground objects in each clip and initializing another set of 3DGS representing background of each clip in accordance with the present disclosure.

FIG. 7 shows an example process for image generation in accordance with the present disclosure.

FIG. 8 shows an example process for merging foreground and background images with 2D learnable parameters in accordance with the present disclosure.

FIG. 9 shows example quantitative evaluation results associated with video reconstruction in accordance with the present disclosure.

FIG. 10 shows example quantitative evaluation results associated with video editing in accordance with the present disclosure.

FIG. 11 shows example qualitative evaluation results associated with video editing in accordance with the present disclosure.

DETAILED DESCRIPTION OF ILLUSTRATIVE EMBODIMENTS

Figure 1:
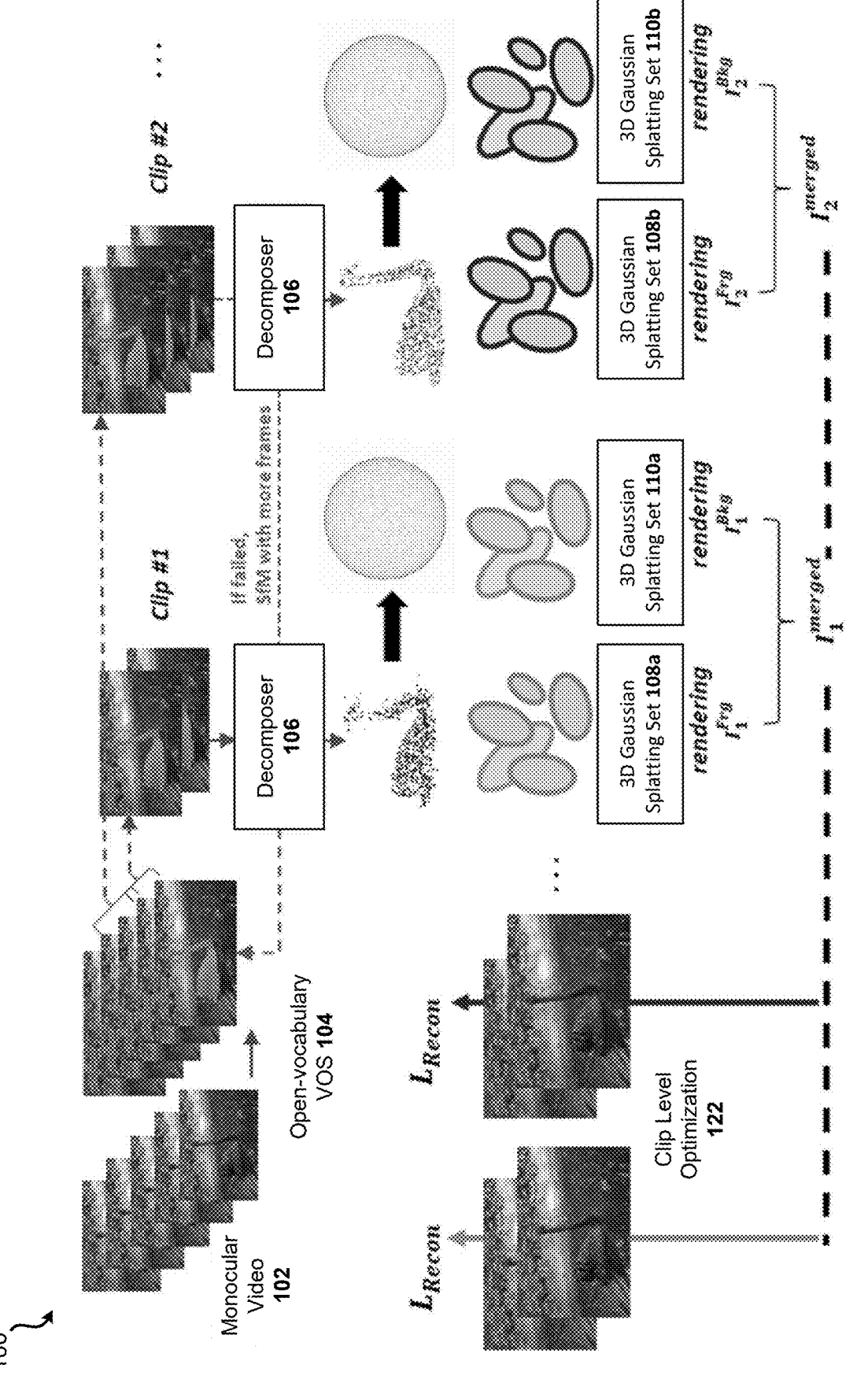
FIG. 1 shows an example system for image generation in accordance with the present disclosure.

The necessity for high-quality scene representation (e.g., reconstructing and rendering views) is increasingly demanded across various applications, such as film and entertainment, robotics, augmented reality, and virtual reality. In response to this need, there has been a notable advancement in relevant technology. Three-dimensional gaussian splatting (3DGS) is one such technique that allows for real-time rendering of photorealistic scenes learned from small samples of images. 3DGS is increasingly being used for view reconstruction and synthesis using multiple camera views. However, it may be challenging to use 3DGS in dynamic monocular video settings, particularly regarding object movement and complex backgrounds in single-camera videos. In particular, 3DGS may rely on COLMAP, which is a general-purpose, end-to-end image-based 3D reconstruction pipeline (e.g., Structure-from-Motion (SfM) and Multi-View Stereo (MVS)) that offers a wide range of features for reconstruction of ordered and unordered image collections. Object movement and complex backgrounds in single-camera videos may compromise the accuracy of COLMAP in capturing 3D points, resulting in ineffective representations of foreground objects and cluttered backgrounds using 3D Gaussians.

The techniques described herein address these challenges. Described herein are methods and systems for reconstructing and editing dynamic monocular videos. The techniques described herein utilize a modified version of COLMAP that is applied to videos in a masked and clipped manner (i.e., MC-COLMAP). An open-vocabulary video segmenter is employed to extract segmentation masks for foreground moving objects and divide long video sequences into shorter clips to minimize motion within each clip. This enables COLMAP to focus on foreground objects within each clip, effectively generating 3D points for them. Meanwhile, the cluttered background is modeled with spherical-shaped random 3D points, surrounding the pre-extracted 3D points of foreground moving objects. For each video clip, two sets of 3D gaussian splatters are used to represent the foreground and background 3D points, respectively. Afterwards, a 2D learnable parameter map is adopted to merge the foreground and background views rendered from each set of 3D gaussian splatters. The resulting merged views faithfully represent the video frames.

A monocular video may be decomposed into a plurality of clips. For example, the monocular video can be decomposed using two decomposition strategies, spatial decomposition powered by an open vocabulary video segmenter for mitigating background clutter, and temporal decomposition for breaking down the entire monocular video into a plurality of shorter video clips. Given the decompositions, foreground points can be extracted from each video clip. The foreground points can be 3D points of masked foreground moving objects. The cluttered background of each video clip can be modeled with spherical shaped random 3D background points, surrounding the pre-extracted foreground points.

For each video clip, two 3D gaussians splatters can be used to represent the foreground points and the background points, respectively. For example, a first 3D gaussian splatting set can be used to represent the foreground points, and a second 3D gaussian splatting set can be used to represent the background points. A 2D learnable parameter map can merge the foreground and background views, rendered from the first 3D gaussian splatting set and the second 3D gaussian splatting set, respectively. The merged views enable high-fidelity video reconstruction and video editing.

FIG. 1 illustrates an example system 100 for reconstructing and editing monocular videos using 3DGS in accordance with the present disclosure. A monocular video 102 may be decomposed into a plurality of clips. Decomposing the monocular video 102 may comprise performing spatial decomposition and temporal decomposition on the monocular video 102 to generate the plurality of clips. The monocular video 102 may be decomposed using an open-vocabulary video object segmentation network (open-vocabulary VOS) 104 and a decomposer 106. The open-vocabulary VOS 104 may be employed to spatially decompose video frames. The decomposer 106 may be configured to temporally decompose the video frames. The decompositions facilitate the extraction of 3D points of masked foreground moving objects in each video clip by utilizing MC-COLMAP.

Spatial decomposition may be performed to reduce the background cluttering effect. The open-vocabulary video object segmentation network 104 may extract segmentation masks from foreground moving objects in the video V as follows: $V^f=S(V, \text{class})$, where S denotes the open-vocabulary video object segmentation network 104, $V^f$ denotes the extracted segmentation masks of foreground moving objects and class denotes a user-guided text prompt (a required input for the segmentation network to specify the target object).

The segmentation masks $V^f$ for foreground objects, which may span the entire video sequence, may present a processing challenge for COLMAP due to their intricate motion dynamics. To mitigate this complexity, temporal decomposition may be performed to split (e.g., divide) the video sequence into multiple shorter video clips. This division ensures that objects exhibit reduced motion within each clip, thus facilitating more manageable processing for COLMAP. Formally $V^f$ may be split into multiple M clips $$\{V_j^f\}_{j=1}^M.$$

Rather than evenly dividing the video sequence into M clips, each containing k frames, the decomposer 106 may utilize a progressive scheme that addresses potential failure cases, such as when the foreground object remains static within a clip. The progressive scheme may make the k frames inadequate for point cloud extraction or registration in SfM. The first clip may be initialized with the first k frames $$(\text{i.e., } V_1^f = \{x_i\}_{i=1}^k).$$

The decomposer function R (e.g., function utilized by the decomposer 106) may fails to process the clip (i.e., status1≠'Success') if a quantity of frames in the clip are inadequate to generate 3D points for the clip. If the decomposer function R fails to process the clip, one additional consecutive frame may be iteratively added into the current clip until the decomposer function returns a 'Success' status. Subsequently, the next clip commences with the next unprocessed frame, also initialized with k frames. This process continues until the entire video sequence is processed. The decomposer 106 (denoted below as $R_{MC}$) yields multiple sets of masked and clipped 3D point clouds, along with their corresponding views from M clips:

$$\{(p_j, c_j)\}_{j=1}^M = R_{MC}(S(V, \text{class})). \qquad \text{Equation 1}$$

A first set of three-dimensional Gaussian Splatting (3DGS) may be initialized and optimized for each clip, e.g., the set of 3DGS 108a for a first clip, the set of 3DGS 108b for a second clip, and so on. The first set of 3DGS for each clip may represent foreground objects in the corresponding clip. Foreground 3D points corresponding to the foreground objects in each of the plurality of clips may be extracted. The first set of 3DGS representing the foreground objects in each of the plurality of clips may be initialized based on the extracted foreground 3D points. For example, for each video clip, the 3D point clouds for foreground moving objects, derived from Equation 1, serve as initialization for optimizing the first set of 3DGS for each clip. This process may yield a set of 3D Gaussian $$\{G_j^{Frg}\}_{j=1}^M,$$

tailored for those foreground point clouds $$\{(c_j, p_j)_j\}_{j=1}^M.$$

With this, the foreground objects may successfully be represented using 3D Gaussians.

A second set of 3DGS may be initialized and optimized for each clip, e.g., the set of 3DGS 110a for the first clip, the set of 3DGS 110b for the second clip, and so on. The second set of 3DGS for each clip may represent a background in the corresponding clip. Background 3D points corresponding to the background in each of the plurality of clips may be generated utilizing spherical-shaped random point clouds surrounding the extracted foreground 3D points. The second set of 3DGS representing the background in each of the plurality of clips may be initialized based on the background 3D points. For example, for each video clip, to model the cluttered background, spherical-shaped random point clouds $$\{p_j^{Bkg}\}_{j=1}^M,$$

surrounding the previously extracted foreground 3D points may be utilized. These background random point clouds may serve as the initialization for optimizing background 3DGS, yielding a set of 3DGS $$\{G_j^{Bkg}\}_{j=1}^M.$$

Notably, the spherical-shaped random point clouds are defined by two hyper-parameters: number of points nBkg and radius $r_i$. nBkg may be fixed, for example, such as to 60 k points and $r_i$ may be fixed, such as to three times larger than the distance of the foreground points.

In embodiments, deformation operations may be performed on the first set of 3DGS and the second set of 3DGS. For example, the first set of 3DGS and the second set of 3DGS may be enhanced with a deformable network extended for clip-level processing, resulting in:

$$Frg\text{-}3DGS{:}\{G_j^{Frg}(\{x_j, r_j, s_j\} + \delta_j^{Frg}, \sigma_j, SH_j)\}_{j=1}^M$$

$$Bkg\text{-}3DGS{:}\{G_j^{Bkg}(\{x_j, r_j, s_j\} + \delta_j^{Bkg}, \sigma_j, SH_j)\}_{j=1}^M$$

where $\delta_j$ is the deformation within the j-th clip to transform center $x_j$, rotation $r_j$, and scale $s_j$, according to each clip center and normalized time. The superscript Frg and Bkg denote foreground and background, respectively. The deformation network may be implemented with 4D multi-resolution hash encoding. The first set of 3DGS and the second set of 3DGS may be reformulated as a clip-3DGS, $$\{G_j^{Frg}, G_j^{Bkg}\}_{j=1}^M,$$

corresponding to each of the plurality of clips. For example, the two sets of Frg-3DGS and Bkg-3DGS may be reformulated as Clip-3DGS, where each clip contains its corresponding foreground 3DGS and background 3DGS and. The clip 3DGS may be processed in a clip-by-clip manner.

In embodiments, two distinct images may be generated (e.g., rendered) for each frame comprised in each of the plurality of clips. A first of the two images may be generated based on the first set of 3DGS. The second of the two images may be generated based on the second set of 3DGS. For example, for the j-th clip, a differentiable point-based rendering technique may be leveraged to process the two 3D Gaussians $$G_j^{Frg} \text{ and } G_j^{Bkg}$$

to generate the two distinct rendered images for each frame within the j-th clip. Specifically, rendering the i-th video frame produces two images, $$\{I_i^{Frg}, I_i^{Bkg}\},$$

derived from $$G_j^{Frg} \text{ and } G_j^{Bkg},$$

respectively.

A merging operation may be performed on the two images. Merging the two images may generate a resulting image for each frame in each of the plurality of clips. The resulting image may accurately represent a corresponding frame in the monocular video 102. To seamlessly merge these images in both the height H and width W dimensions, a 2D learnable parameter may be used. The 2D learnable parameter, which may be denoted as $\alpha \in R^{H \times W}$, facilitates pixel-wise merging with corresponding learnable parameters initialized to a value of 0.5. Formally:

$$I_i^{merged} = \alpha_i \times I_i^{Frg} + (1 - \alpha_i) \times I_i^{Bkg}, \qquad \text{Equation 2}$$

where $$I_i^{merged}$$

is the merged result for the i-th video frame. Through the merging operation, merged images for all video frames may be derived by optimizing N different $\alpha$ values, where N represents the total number of frames in the video.

In embodiments, clip-level optimization 122 may be performed by optimizing merged rendered outputs for each of the plurality of clips. The merged rendered outputs for each of the plurality of clips may be optimized using a reconstruction loss, denoted as $L_{recon}$. The components of the reconstruction loss may be calculated by comparing three rendered images—the foreground $$I_i^{Frg},$$

the background $$I_i^{Bkg},$$

and the merged image $$I_i^{merged}$$

against their respective ground truth images.

The techniques described above may be used for video reconstruction. The reconstruction of a video can be achieved by sequentially rendering the Frg-3DGS and Bkg-3DGS for each clip, even in the absence of ground truth images. Subsequently, the rendered images from each frame may be merged using a pre-trained alpha parameter, such as that shown in Equation 2. This enables the generation of a cohesive video sequence without the need for pre-existing images.

The techniques described above may be used for video editing. The utilization of pre-trained 3D Gaussians showcases remarkable proficiency in preserving structure and ensuring temporal consistency across video frames, making them highly suitable for video editing tasks. Edited video frames, denoted as $$\{I_i^{edited}\}_{i=1}^N,$$

can be sourced from any off-the-shelf video editors. To address inconsistencies in style and object presence within these edited videos, pre-trained 3D Gaussians may be leveraged. This approach involves maintaining the original structural context by fixing the positional (x, r, s) and deformation parameters (6) of both Frg-3DGS and Bkg-3DGS. Simultaneously, the color value (SH) and opacity (a) parameters may be adjusted to align with the style of the edited frames, accomplished by minimizing the reconstruction loss between rendered images $$\{I_i^{merged}\}_{i=1}^N$$

and edited frames $$\{I_i^{edited}\}_{i=1}^N.$$

Altering the color value of 3D Gaussians enables corresponding areas of rendered images to maintain consistency within each clip.

The techniques described above with regard to FIG. 1 significantly expand the capabilities of 3D gaussian splatting to dynamic monocular video scenes, notably enhancing temporal consistency in both video reconstruction and editing. For instance, the techniques described above with regard to FIG. 1 consistently capture dynamic objects, while also enriching style smoothness in scenarios and ensuring structure consistency.

FIG. 2 illustrates an example process 200 for image generation. Although depicted as a sequence of operations in FIG. 2, those of ordinary skill in the art will appreciate that various embodiments may add, remove, reorder, or modify the depicted operations.

At 202, spatial decomposition and temporal decomposition may be performed on a video. The spatial decomposition and temporal decomposition may be performed on the video to generate a plurality of clips. The video may be a monocular video. The spatial decomposition may be powered by an open vocabulary video segmenter for mitigating background clutter. The temporal decomposition may be performed for breaking down the entire monocular video into a plurality of shorter video clips.

Given the decompositions, foreground points can be extracted from each video clip. At 204, a first set of 3DGS may be initialized and/or optimized. The first set of 3DGS may represent foreground objects in each of the plurality of clips. The first set of 3DGS may be initialized based on the foreground points extracted from each video clip. The foreground points can be 3D points of masked foreground moving objects. The cluttered background of each video clip can be modeled with spherical shaped random background points, surrounding the pre-extracted foreground points. At 206, a second set of 3DGS may be initialized and/or optimized. The second set of 3DGS may represent a background in each of the plurality of clips. The second set of 3DGS may be initialized based on the spherical shaped random background points surrounding the pre-extracted foreground points.

At 208, two images may be generated for each frame comprised in each of the plurality of clips. The two images may be generated based on the first set of 3DGS and the second set of 3DGS, respectively. A first of the two images may be generated based on the first set of 3DGS. The second of the two images may be generated based on the second set of 3DGS. For example, for the j-th clip, a differentiable point-based rendering technique may be leveraged to process the two 3D Gaussians $$G_j^{Frg} \text{ and } G_j^{Bkg}$$

to generate the two distinct rendered images for each frame within the j-th clip. Specifically, rendering the i-th video frame produces two images, $$\{I_i^{Frg}, I_i^{Bkg}\},$$

derived from $$G_j^{Frg} \text{ and } G_j^{Bkg},$$

respectively. At 210, a merging operation may be performed on the two images. Merging the two images may cause generation of a resulting image for each frame in each of the plurality of clips. The resulting image may accurately represent a corresponding frame in the monocular video.

Figure 3:
FIG. 3 shows an example process for performing spatial and temporal decompositions on a video in accordance with the present disclosure.

FIG. 3 illustrates an example process 300 for performing spatial and temporal decompositions on a video. Although depicted as a sequence of operations in FIG. 3, those of ordinary skill in the art will appreciate that various embodiments may add, remove, reorder, or modify the depicted operations.

At 302, spatial decomposition may be performed. The spatial decomposition may be performed on a monocular video. The spatial decomposition may be performed by extracting segmentation masks of foreground objects comprised in the monocular video. The foreground objects may comprise moving objects. An open-vocabulary video object segmentation network may extract segmentation masks from the foreground moving objects in the video V as follows: $V^f = S(V, class)$, where S denotes the open-vocabulary video object segmentation network, $V^f$ denotes the extracted segmentation masks of foreground moving objects and class denotes a user-guided text prompt (a required input for the segmentation network to specify the target object).

The segmentation masks $V^f$ for foreground objects, which may span the entire video sequence, may present a processing challenge for COLMAP due to their intricate motion dynamics. To mitigate this complexity, the video sequence may be split (e.g., divided) into multiple shorter video clips. At 304, temporal decomposition may be performed. The temporal decomposition may be performed on the monocular video. The temporal decomposition may be performed by progressively dividing the monocular video into a plurality of clips. This division may ensure that objects exhibit reduced motion within each clip.

FIG. 4 illustrates an example process 400 for performing progressive temporal decomposition. Although depicted as a sequence of operations in FIG. 4, those of ordinary skill in the art will appreciate that various embodiments may add, remove, reorder, or modify the depicted operations.

Rather than evenly dividing a video sequence into M clips, each containing k frames, a progressive scheme that addresses potential failure cases, such as when the foreground object remains static within a clip, may be used to divide the video sequence into clips. The progressive scheme may make the k frames inadequate for point cloud extraction or registration in SfM. A first clip may be initialized with the first k frames $$(\text{i.e., } V_1^f = \{x_i\}_{i=1}^k).$$

At 402, it may be determined that an initial number of frames in a current clip (e.g., the first clip) are inadequate to generate 3D points for the current clip. A decomposer function may fail to process the clip (i.e., status1≠'Success') if the number of frames in the clip are inadequate to generate 3D points for the clip. If the initial number of frames in the current clip are inadequate to generate 3D points for the current clip, one additional consecutive frame may be iteratively added into the current clip until the decomposer function returns a 'Success' status. At 404, an additional consecutive frame may be iteratively added into the current clip. This process may continue until the entire video sequence is processed.

FIG. 5 illustrates an example process 500 for initializing a set of 3DGS representing the foreground objects in each clip and initializing another set of 3DGS representing background of each clip. Although depicted as a sequence of operations in FIG. 5, those of ordinary skill in the art will appreciate that various embodiments may add, remove, reorder, or modify the depicted operations.

A monocular video may be decomposed into a plurality of clips. For example, the monocular video can be decomposed using two decomposition strategies, spatial decomposition powered by an open vocabulary video segmenter for mitigating background clutter, and temporal decomposition for breaking down the entire monocular video into a plurality of shorter video clips. Given the decompositions, foreground points can be extracted from each video clip. At 502, foreground 3D points may be extracted. The foreground 3D points may correspond to foreground objects in each of a plurality of clips. The foreground points can be 3D points of masked foreground moving objects. At 504, background 3D points may be generated. The background 3D points may correspond to a background in each of the plurality of clips. The background 3D points may be generated by utilizing spherical-shaped random point clouds surrounding the extracted foreground 3D points.

For each video clip, two 3D gaussians splatters can be used to represent the foreground points and the background points, respectively. At 506, a first 3D gaussian splatting set may be initialized. The first 3D gaussian splatting set may represent the foreground objects in each of the plurality of clips. The first 3D gaussian splatting set be initialized based on the foreground 3D points. At 508, a second 3D gaussian splatting set may be initialized. The second 3D gaussian splatting set may represent the background in each of the plurality of clips. The second 3D gaussian splatting set be initialized based on the background 3D points.

Figure 6:
FIG. 6 shows an example process for performing deformations and reformulating as a clip-3DGS in accordance with the present disclosure.

FIG. 6 illustrates an example process 600 for performing deformations and reformulating as a clip-3DGS. Although depicted as a sequence of operations in FIG. 6, those of ordinary skill in the art will appreciate that various embodiments may add, remove, reorder, or modify the depicted operations.

At 602, deformation operations may be performed on a first set of 3DGS and a second set of 3DGS, respectively. For example, the first set of 3DGS and the second set of 3DGS may be enhanced with a deformable network extended for clip-level processing, resulting in:

$$Frg\text{-}3DGS\colon \left\{G_j^{Frg}(\{x_j, r_j, s_j\} + \delta_j^{Frg}, \sigma_j, SH_j)\right\}_{j=1}^{M}$$

$$Bkg\text{-}3DGS\colon \left\{G_j^{Bkg}(\{x_j, r_j, s_j\} + \delta_j^{Bkg}, \sigma_j, SH_j)\right\}_{j=1}^{M}$$

where $\delta_j$ is the deformation within the j-th clip to transform center $x_j$, rotation $r_j$, and scale $s_j$, according to each clip center and normalized time. The superscript Frg and Bkg denote foreground and background, respectively. The deformation network may be implemented with 4D multi-resolution hash encoding.

At 604, the first set of 3DGS and the second set of 3DGS may be reformulated. The first set of 3DGS and the second set of 3DGS may be reformulated as a clip-3DGS corresponding to each of the plurality of clips. For example, the first set of 3DGS and the second set of 3DGS may be reformulated as a clip-3DGS, where each clip contains its corresponding foreground 3DGS and background 3DGS and. The clip 3DGS may be processed in a clip-by-clip manner.

FIG. 7 illustrates an example process 700 for image generation. Although depicted as a sequence of operations in FIG. 7, those of ordinary skill in the art will appreciate that various embodiments may add, remove, reorder, or modify the depicted operations.

At 702, a video may be decomposed into a plurality of clips. The video may be a monocular video. The video may be spatially and temporally decomposed. Given the decompositions, foreground points can be extracted from each video clip. At 704, a first set of 3DGS may be initialized and/or optimized. The first set of 3DGS may represent foreground objects in each of the plurality of clips. The first set of 3DGS may be initialized based on the foreground points extracted from each video clip. The cluttered background of each video clip can be modeled with spherical shaped random background points, surrounding the pre-extracted foreground points. A second set of 3DGS may be initialized and/or optimized. The second set of 3DGS may represent a background in each of the plurality of clips. The second set of 3DGS may be initialized based on the spherical shaped random background points surrounding the pre-extracted foreground points.

At 706, two images may be generated for each frame comprised in each of the plurality of clips. The two images may be generated based on the first set of 3DGS and the second set of 3DGS, respectively. A first of the two images may be generated based on the first set of 3DGS. The second of the two images may be generated based on the second set of 3DGS. For example, for the j-th clip, a differentiable point-based rendering technique may be leveraged to process the two 3D Gaussians $$G_j^{Frg} \text{ and } G_j^{Bkg}$$

to generate the two distinct rendered images for each frame within the j-th clip. Specifically, rendering the i-th video frame produces two images, $$\{I_i^{Frg}, I_i^{Bkg}\},$$

derived from $$G_j^{Frg} \text{ and } G_j^{Bkg},$$

respectively. The two images may be merged to generate a merged image $$I_i^{merged}.$$

At 708, a clip-level optimization may be performed. The clip level optimization may be performed by optimizing merged rendered outputs for each of the plurality of clips using a reconstruction loss. The reconstruction loss may be calculated by comparing three rendered images—the foreground $$I_i^{Frg},$$

the background $$I_i^{Bkg},$$

and the merged merged $$I_i^{merged}$$

against their respective ground truth images.

FIG. 8 illustrates an example process 800 for merging foreground and background images by employing a 2D learnable parameter. Although depicted as a sequence of operations in FIG. 8, those of ordinary skill in the art will appreciate that various embodiments may add, remove, reorder, or modify the depicted operations.

A merging operation may be performed on two images. Merging the two images may cause generation of a resulting image for each frame in each of the plurality of clips. The resulting image may accurately represent a corresponding frame in the monocular video. To seamlessly merge these images in both the height H and width W dimensions, a 2D learnable parameter may be used. At 802, a 2D learnable parameter may be employed. The 2D learnable parameter may be employed for facilitating pixel-wise merging with corresponding learnable parameter values. For example, the 2D learnable parameter, which may be denoted as a E $R^{H \times W}$, facilitates pixel-wise merging with corresponding learnable parameters initialized to a value of 0.5. Through the merging operation, merged images for all video frames may be derived. At 804, resulting images for all frames in a monocular video may be generated by optimizing N different parameter values, where N represents a total number of frames in the monocular video.

To assess the performance of the techniques described herein for video reconstruction in real-world monocular video scenes, a dataset comprising 28 representative videos, each with a resolution of 480p, was constructed. These videos feature a varied array of foreground moving objects, encompassing humans, vehicles, and animals, together with cluttered backgrounds. To assess the performance of the techniques described herein for video editing, a dataset consisting of 76 videos (480p), where each video was edited according to four different types of text prompts, including: style change, object change, background change, and multiple change, was used.

To train the system (e.g., the system 100), two sets of 3D Gaussians (both Frg-3DGS and Bkg-3DGS) in each clip may be sequentially optimized with three different total numbers of training iterations: a total of 3 k, 5 k and 10 k iterations, each targeting a distinct time-accuracy trade-off (e.g., 10 k iterations for the best quality but the slowest training time). With optimized 3D Gaussians for each clip, video reconstruction may proceed through sequential rendering of the clips. For video editing, 3D Gaussians optimized for original videos may undergo fine-tuning for 1 k iterations to update the spherical harmonic coefficients (SH) and opacity (a), guided by the initial edited videos (obtained from an off-the-shelf video editor). Each experiment may use a single A100 GPU.

To evaluate video reconstruction quality, two principal metrics were utilized: Peak Signal-to-Noise Ratio (PSNR) and Structural Similarity Index Measure (SSIM). These metrics collectively appraise the fidelity of the reconstructed video in comparison to the original. Additionally, efficiency is gauged through the metric of Training Time, which quantifies the required training time, thus indicating the computational efficiency of the reconstruction algorithm. To assess video editing quality, a metric (e.g., WarpSSIM score) that computes the mean SSIM score between the edited video warped by the optical flow (derived from the source video) and corresponding original edited video was used. This metric offers valuable insight into the temporal consistency of post-editing. Furthermore, a metric (Qedit), which is a comprehensive video editing metric that combines the WarpSSIM score with a CLIPScore text, was used to provide a multiplicative assessment of the overall video editing performance.

As the techniques described herein aim to reconstruct videos by learning scene representations, the techniques described herein were compared with two representative methods: NeRF-based and 3DGS based representations. For NeRF-based methods, three state-of-the-art baselines were selected. The baselines are: 1) NLA, which proposes a video reconstruction and editing method using layered atlases powered by the NeRF framework; 2) CoDEF, which leverages a canonical space of deformation fields to reconstruct and edit videos; and 3) RobustDyn, an advanced view reconstruction and synthesis model that estimates camera poses in diverse settings. For 3DGS-based methods, the original 3DGS method, which lacks modules specific to video scenes, was first considered. Additionally, Deformable-3DGS, a state-of-the-art approach that utilizes a deformation network on 3D Gaussian, was selected, serving as another strong baseline.

Comprehensive video reconstruction experiments encompassing 28 videos were conducted. The three NeRFbased methods generally exhibited limitations in both reconstruction quality (measured by PSNR and SSIM) and efficiency (training time), primarily attributed to their implicit neural representation. Conversely, the 3DGS method demonstrated a significant reduction in training time (less than 10 minutes in average of 20 videos), owing to its explicit 3D Gaussian representation and efficient rasterization. However, the 3DGS method notably exhibits performance degradation (average PSNR of 20 videos: 24.8), as it is tailored for static scenes and lacks design considerations for dynamic video scenes. On the other hand, the state-of-the-art baseline Deformable-3DGS, which employs a deformation field for time dimension on 3DGS, shows improved video reconstruction quality (average PSNR of 20 videos: 30.6); nevertheless, this enhancement comes at the expense of compromised training efficiency (50 minutes in average of 20 videos). Furthermore, due to the fundamental issue in COLMAP, they cannot conduct reconstruction on 8 videos, which hinders 3DGS from being used for wild video datasets. On the other hand, the techniques described herein, powered by the proposed modified version of COLMAP and framework of Frg-3DGS/Bkg-3DGS, can reconstruct all 28 videos in high quality with shorter training time (iteration 3 k: 37.6 PSNR with 11 minutes; iteration 5 k: 41.2 PSNR with 22 minutes; iteration 10 k: 45.8 PSNR with 56 minutes; all results are measured by taking average over 28 videos).

For better comparison, the average score of each metric across different methods is shown in the table 900 of FIG. 9. FIG. 9 shows a table 900 illustrating example quantitative evaluation results associated with video reconstruction in accordance with the present disclosure. As shown in the table 900, upon training for 3 k iterations, the techniques described herein (e.g., Video-3DGS) significantly surpasses both the NeRF-based SoTA, CoDeF, and the 3DGS-based SoTA, Deform-3DGS, in terms of video reconstruction quality and training efficiency. Specifically, Video-3DGS achieves an improvement in PSNR by +8.2 and +7 over CoDeF and Deform-3DGS, respectively. Furthermore, Video-3DGS demonstrates a notable improvement in training time efficiency, being 2.5 times faster than CoDeF and 4.5 times faster than Deform-3DGS.

To evaluate the performance of the techniques described herein on video editing, three zero-shot video editing methods were chosen as baseline comparisons. The selected three zero-shot video editing methods are as follows: 1) Text2Video-Zero, which extends Instructpix2pix to the video domain by inserting temporal attention within the diffusion model; 2) TokenFlow, which achieves temporal smoothness through the propagation of diffusion features using inter-frame correspondences; and 3) RAVE, which employs a noise-shuffling strategy and grid trick for enhancing video editing capabilities.

Figure 10:
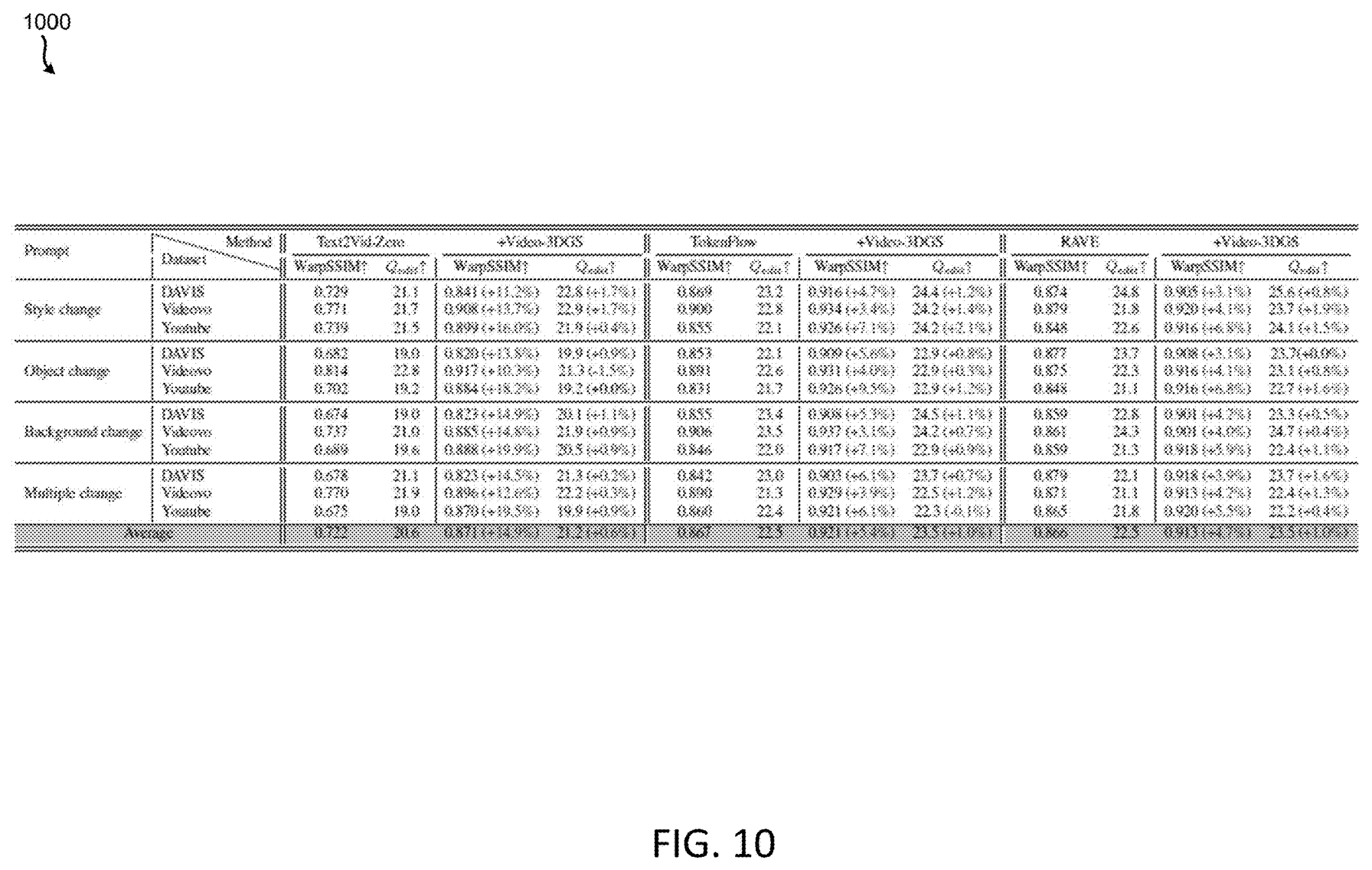

Video-3DGS's editing capability on top of the selected three zero-shot video editing methods is shown in the table 1000 of FIG. 10. FIG. 10 shows a table 1000 illustrating example quantitative evaluation results associated with video editing in accordance with the present disclosure. Video-3DGS significantly enhances temporal consistency (e.g., WarpSSIM score) across various editing scenarios spanning three different datasets. Consequently, this improvement generally yields superior final video editing results (Qedit). It proves that Video-3DGS generally provides robust temporal editing guidance to existing video editors.

FIG. 11 shows example qualitative evaluation results 1100 associated with video editing in accordance with the present disclosure. More specifically, FIG. 11 shows a qualitative comparison between single update and progressive update. Text2Video-Zero takes 30 denoising steps. As such, the video initially edited with Text2Video-Zero has a loss of structure. Thus, despite the effort of preserving the structure using Video-3DGS, it is still hard to recover the original context using a single update, as shown in the third column of FIG. 11. To overcome this issue, the proposed progressive video editing splits the total number of denoising steps into three stages (each contains 10 steps) and conducts 3DGS guided video editing iteratively. As shown in the fourth column of FIG. 11, this progressive update increases not only temporal consistency, but also overall video editing quality.

Qualitative evaluation results show that the proposed Video-3DGS consistently demonstrates higher reconstruction quality than various state of the art video reconstruction techniques: NLA (which proposes a video reconstruction and editing method using layered atlases powered by the NeRF framework), CoDEF (which leverages a canonical space of deformation fields to reconstruct and edit videos), RobustDyn (an advanced view reconstruction and synthesis model that estimates camera poses in diverse settings), the original 3DGS method (which lacks modules specific to video scenes), and Deformable-3DGS (which employs a deformation field for time dimension on 3DGS).

The qualitative evaluation results show that Video-3DGS effectively enhances the temporal consistency in the edited results across the zero-shot video editing method Token-Flow, which achieves temporal smoothness through the propagation of diffusion features using inter-frame correspondences. As discussed above, Video-3DGS also effectively enhances the temporal consistency in the edited results across other zero-shot video editing methods, including Text2Video-Zero, which extends Instructpix2pix to the video domain by inserting temporal attention within the diffusion model, and RAVE, which employs a noise-shuffling strategy and grid trick for enhancing video editing capabilities.

Figure 12:
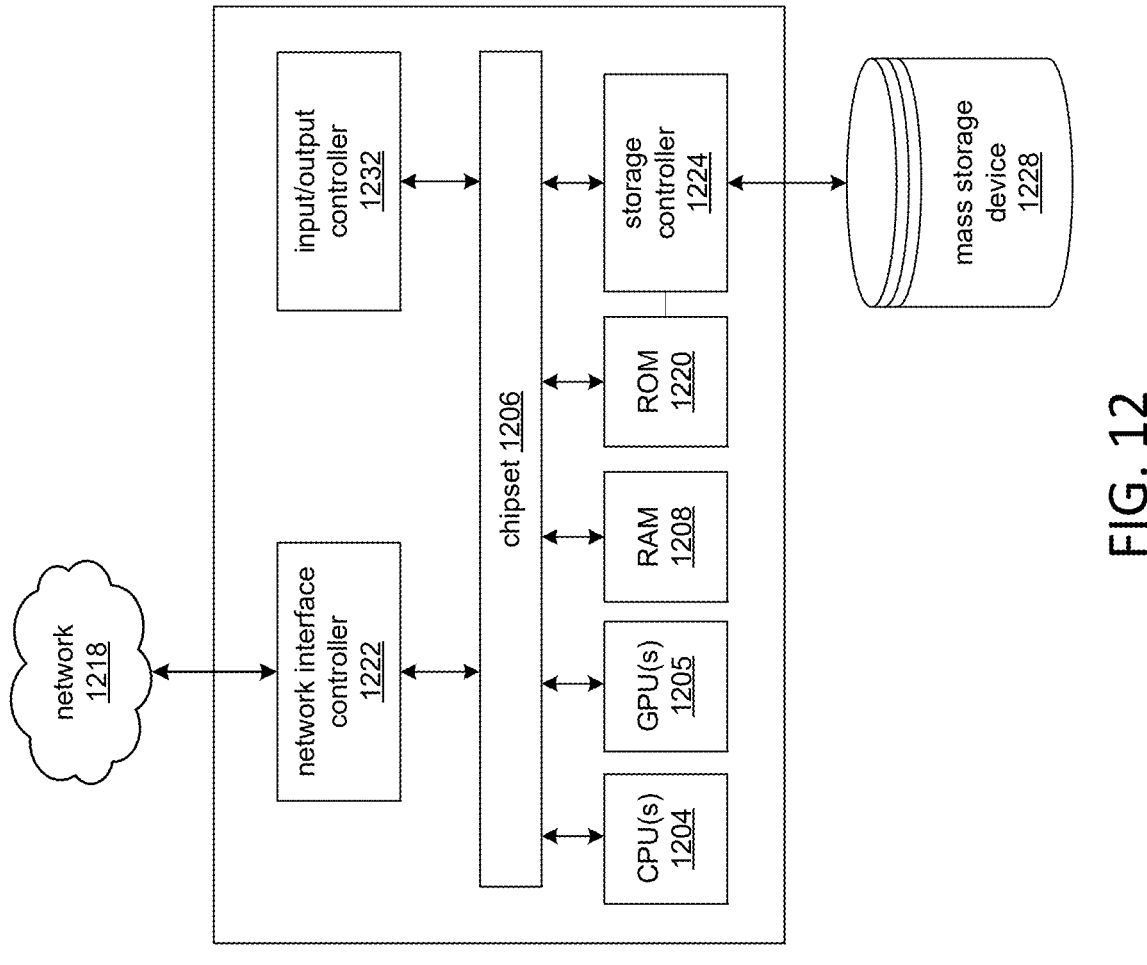
FIG. 12 shows an example computing device which may be used to perform any of the techniques disclosed herein.

FIG. 12 illustrates a computing device that may be used in various aspects, such as the models, components, and/or devices depicted in any of FIG. 1. With regard to FIG. 1, any or all of the components may each be implemented by one or more instance of a computing device 1200 of FIG. 12. The computer architecture shown in FIG. 12 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1200 may include a baseboard, or "motherboard," which is a printed circuit board to which a multitude of components or devices may be connected by way of a system bus or other electrical communication paths. One or more central processing units (CPUs) 1204 may operate in conjunction with a chipset 1206. The CPU(s) 1204 may be standard programmable processors that perform arithmetic and logical operations necessary for the operation of the computing device 1200.

The CPU(s) 1204 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1204 may be augmented with or replaced by other processing units, such as GPU(s) 1205. The GPU(s) 1205 may comprise processing units specialized for but not necessarily limited to highly parallel computations, such as graphics and other visualization-related processing.

A chipset 1206 may provide an interface between the CPU(s) 1204 and the remainder of the components and devices on the baseboard. The chipset 1206 may provide an interface to a random-access memory (RAM) 1208 used as the main memory in the computing device 1200. The chipset 1206 may further provide an interface to a computer-readable storage medium, such as a read-only memory (ROM) 1220 or non-volatile RAM (NVRAM) (not shown), for storing basic routines that may help to start up the computing device 1200 and to transfer information between the various components and devices. ROM 1220 or NVRAM may also store other software components necessary for the operation of the computing device 1200 in accordance with the aspects described herein.

The computing device 1200 may operate in a networked environment using logical connections to remote computing nodes and computer systems through local area network (LAN). The chipset 1206 may include functionality for providing network connectivity through a network interface controller (NIC) 1222, such as a gigabit Ethernet adapter. A NIC 1222 may be capable of connecting the computing device 1200 to other computing nodes over a network 1216.

It should be appreciated that multiple NICs 1222 may be present in the computing device 1200, connecting the computing device to other types of networks and remote computer systems.

The computing device 1200 may be connected to a mass storage device 1228 that provides non-volatile storage for the computer. The mass storage device 1228 may store system programs, application programs, other program modules, and data, which have been described in greater detail herein. The mass storage device 1228 may be connected to the computing device 1200 through a storage controller 1224 connected to the chipset 1206. The mass storage device 1228 may consist of one or more physical storage units. The mass storage device 1228 may comprise a management component 1210. A storage controller 1224 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1200 may store data on the mass storage device 1228 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1228 is characterized as primary or secondary storage and the like.

For example, the computing device 1200 may store information to the mass storage device 1228 by issuing instructions through a storage controller 1224 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1200 may further read information from the mass storage device 1228 by detecting the physical states or characteristics of one or more particular locations within the physical storage units.

In addition to the mass storage device 1228 described above, the computing device 1200 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1200.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1228 depicted in FIG. 12, may store an operating system utilized to control the operation of the computing device 1200. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1228 may store other system or application programs and data utilized by the computing device 1200.

The mass storage device 1228 or other computer-readable storage media may also be encoded with computer-executable instructions, which, when loaded into the computing device 1200, transforms the computing device from a general-purpose computing system into a special-purpose computer capable of implementing the aspects described herein. These computer-executable instructions transform the computing device 1200 by specifying how the CPU(s) 1204 transition between states, as described above. The computing device 1200 may have access to computer-readable storage media storing computer-executable instructions, which, when executed by the computing device 1200, may perform the methods described herein.

A computing device, such as the computing device 1200 depicted in FIG. 12, may also include an input/output controller 1232 for receiving and processing input from a number of input devices, such as a keyboard, a mouse, a touchpad, a touch screen, an electronic stylus, or other type of input device. Similarly, an input/output controller 1232 may provide output to a display, such as a computer monitor, a flat-panel display, a digital projector, a printer, a plotter, or other type of output device. It will be appreciated that the computing device 1200 may not include all of the components shown in FIG. 12, may include other components that are not explicitly shown in FIG. 12, or may utilize an architecture completely different than that shown in FIG. 12.

As described herein, a computing device may be a physical computing device, such as the computing device 1200 of FIG. 12. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method, comprising:
performing spatial decomposition and temporal decomposition on a monocular video to generate a plurality of clips;
initializing and optimizing a first set of three-dimensional Gaussian Splatting (3DGS) representing foreground objects in each of the plurality of clips;
initializing and optimizing a second set of 3DGS representing background in each of the plurality of clips;
generating two images for each frame comprised in each of the plurality of clips based on the first set of 3DGS and the second set of 3DGS, respectively; and
performing merging operation on the two images and generating a resulting image for each frame in each of the plurality of clips, wherein the resulting image accurately represents a corresponding frame in the monocular video.

2. The method of claim 1, further comprising:
performing the spatial decomposition by extracting segmentation masks of the foreground objects comprised in the monocular video, wherein the foreground objects comprise moving objects.

3. The method of claim 1, further comprising:
performing the temporal decomposition by progressively dividing the monocular video into the plurality of clips.

4. The method of claim 3, wherein the progressively dividing the monocular video into the plurality of clips comprises:
iteratively adding an additional consecutive frame into a current clip in response to determining that an initial number of frames in the current clip were inadequate to generate 3D points for the current clip.

5. The method of claim 1, further comprising:
extracting foreground 3D points corresponding to the foreground objects in each of the plurality of clips; and
generating background 3D points corresponding to the background in each of the plurality of clips by utilizing spherical-shaped random point clouds surrounding the extracted foreground 3D points.

6. The method of claim 5, further comprising:
initializing the first set of 3DGS representing the foreground objects in each of the plurality of clips based on the foreground 3D points; and initializing the second set of 3DGS Gaussians representing the background in each of the plurality of clips based on the background 3D points.

7. The method of claim 1, further comprising:
performing deformation operations on the first set of 3DGS and the second set of 3DGS, respectively; and
reformulating the first set of 3DGS and the second set of 3DGS as a clip-3DGS corresponding to each of the plurality of clips.

8. The method of claim 1, further comprising:
performing clip-level optimization by optimizing merged rendered outputs for each of the plurality of clips using a reconstruction loss.

9. The method of claim 1, wherein the performing merging operation on the two images to generate a resulting image for each frame in each of the plurality of clips comprises:
employing a two dimensional (2D) learnable parameter for facilitating pixel-wise merging with corresponding learnable parameter values; and
generating resulting images for all frames in the monocular video by optimizing N different parameter values, wherein N represents a total number of frames in the monocular video.

10. A system comprising:
at least one processor; and
at least one memory communicatively coupled to the at least one processor and comprising computer-readable instructions that upon execution by the at least one processor cause the at least one processor to perform operations comprising:
performing spatial decomposition and temporal decomposition on a monocular video to generate a plurality of clips;
initializing and optimizing a first set of three-dimensional Gaussian Splatting (3DGS) representing foreground objects in each of the plurality of clips;
initializing and optimizing a second set of 3DGS representing background in each of the plurality of clips;
generating two images for each frame comprised in each of the plurality of clips based on the first set of 3DGS and the second set of 3DGS, respectively; and
performing merging operation on the two images and generating a resulting image for each frame in each of the plurality of clips, wherein the resulting image accurately represents a corresponding frame in the monocular video.

11. The system of claim 10, the operations further comprising:
performing the spatial decomposition by extracting segmentation masks of the foreground objects comprised in the monocular video, wherein the foreground objects comprise moving objects.

12. The system of claim 10, the operations further comprising:
performing the temporal decomposition by progressively dividing the monocular video into the plurality of clips, wherein the progressively dividing the monocular video into the plurality of clips comprises iteratively adding an additional consecutive frame into a current clip in response to determining that an initial number of frames in the current clip were inadequate to generate 3D points for the current clip.

13. The system of claim 10, the operations further comprising:
extracting foreground 3D points corresponding to the foreground objects in each of the plurality of clips; and generating background 3D points corresponding to the background in each of the plurality of clips by utilizing spherical-shaped random point clouds surrounding the extracted foreground 3D points.

14. The system of claim 10, the operations further comprising:

performing clip-level optimization by optimizing merged rendered outputs for each of the plurality of clips using a reconstruction loss.

15. The system of claim 10, wherein the performing merging operation on the two images to generate a resulting image for each frame in each of the plurality of clips comprises:

employing a two dimensional (2D) learnable parameter for facilitating pixel-wise merging with corresponding learnable parameter values; and generating resulting images for all frames in the monocular video by optimizing N different parameter values, wherein N represents a total number of frames in the monocular video.

16. A non-transitory computer-readable storage medium, storing computer-readable instructions that upon execution by a processor cause the processor to implement operations comprising:

performing spatial decomposition and temporal decomposition on a monocular video to generate a plurality of clips;

initializing and optimizing a first set of three-dimensional Gaussian Splatting (3DGS) representing foreground objects in each of the plurality of clips;

initializing and optimizing a second set of 3DGS representing background in each of the plurality of clips;

generating two images for each frame comprised in each of the plurality of clips based on the first set of 3DGS and the second set of 3DGS, respectively; and performing merging operation on the two images and generating a resulting image for each frame in each of the plurality of clips, wherein the resulting image accurately represents a corresponding frame in the monocular video.

17. The non-transitory computer-readable storage medium of claim 16, the operations further comprising:

performing the spatial decomposition by extracting segmentation masks of the foreground objects comprised in the monocular video, wherein the foreground objects comprise moving objects.

18. The non-transitory computer-readable storage medium of claim 16, the operations further comprising:

performing the temporal decomposition by progressively dividing the monocular video into the plurality of clips, wherein the progressively dividing the monocular video into the plurality of clips comprises iteratively adding an additional consecutive frame into a current clip in response to determining that an initial number of frames in the current clip were inadequate to generate 3D points for the current clip.

19. The non-transitory computer-readable storage medium of claim 16, the operations further comprising:

extracting foreground 3D points corresponding to the foreground objects in each of the plurality of clips; and generating background 3D points corresponding to the background in each of the plurality of clips by utilizing spherical-shaped random point clouds surrounding the extracted foreground 3D points.

20. The non-transitory computer-readable storage medium of claim 16, wherein the performing merging operation on the two images to generate a resulting image for each frame in each of the plurality of clips comprises:

employing a two dimensional (2D) learnable parameter for facilitating pixel-wise merging with corresponding learnable parameter values; and generating resulting images for all frames in the monocular video by optimizing N different parameter values, wherein N represents a total number of frames in the monocular video.

* * * * *